United States Patent
Natsume

(10) Patent No.: US 10,630,224 B2
(45) Date of Patent: Apr. 21, 2020

(54) MOTOR CONTROL DEVICE AND MOTOR CONTROL PROGRAM

(71) Applicant: DENSO CORPORATION, Kariya-shi, Aichi (JP)

(72) Inventor: Yohei Natsume, Toyohashi (JP)

(73) Assignee: DENSO CORPORATION, Kariya-shi (JP)

( * ) Notice: Subject to any disclaimer, the term of this patent is extended or adjusted under 35 U.S.C. 154(b) by 0 days.

(21) Appl. No.: 16/085,481

(22) PCT Filed: Mar. 9, 2017

(86) PCT No.: PCT/JP2017/009565
§ 371 (c)(1),
(2) Date: Sep. 14, 2018

(87) PCT Pub. No.: WO2017/169639
PCT Pub. Date: Oct. 5, 2017

(65) Prior Publication Data
US 2019/0123678 A1    Apr. 25, 2019

(30) Foreign Application Priority Data

Mar. 30, 2016 (JP) .............................. 2016-068592

(51) Int. Cl.
| | |
|---|---|
| H02P 29/02 | (2016.01) |
| B60S 1/08 | (2006.01) |
| H02P 29/024 | (2016.01) |
| H02P 7/06 | (2006.01) |
| H02P 7/03 | (2016.01) |
| H02P 7/291 | (2016.01) |
| B60R 16/03 | (2006.01) |

(52) U.S. Cl.
CPC ............ *H02P 29/0241* (2016.02); *B60S 1/08* (2013.01); *H02P 7/05* (2016.02); *H02P 7/06* (2013.01); *H02P 7/291* (2016.02); *B60R 16/03* (2013.01)

(58) Field of Classification Search
None
See application file for complete search history.

(56) References Cited

U.S. PATENT DOCUMENTS 6,147,545 A * 11/2000 Marshall ............ H03K 17/0822
326/28
2016/0352272 A1* 12/2016 Hijikata .................... H02P 8/16

FOREIGN PATENT DOCUMENTS

JP    2015-205574 A    11/2015

* cited by examiner

*Primary Examiner* — Bentsu Ro
(74) *Attorney, Agent, or Firm* — Oliff PLC

(57) ABSTRACT

A motor control device includes: a driving unit that supplies a driving voltage to a motor so as to rotate the motor in a predetermined direction and in a direction opposite to the predetermined direction; a voltage detection unit that detects a voltage of a circuit including the driving unit; and a control unit that has the driving unit execute a voltage drop control that lowers a voltage of the circuit by supplying the driving voltage to the motor and stopping the supply of the driving voltage in a predetermined manner, in a case in which a voltage that is equal to or higher than a threshold voltage is detected by the voltage detection unit in a state in which the motor is not being driven.

14 Claims, 14 Drawing Sheets

MOTOR CONTROL DEVICE AND MOTOR CONTROL PROGRAM

TECHNICAL FIELD

The present disclosure relates to a motor control device and a motor control program.

BACKGROUND ART

In a wiper apparatus for wiping a windshield glass with a wiper blade, the wiper blade attached to a tip of a wiper arm is operated by a wiper motor that rotates upon reception of power from a vehicle battery. However, a surge in which a voltage suddenly increases may be generated in power supplied from a battery. The surge may become a voltage exceeding a withstand voltage of an element such as a capacitor and an integrated circuit constituting the circuit of the wiper apparatus. In such a case, the element constituting the circuit may be damaged.

Even when the surge occurs, if the motor is rotating, overvoltage due to the surge is spent by the rotation of the motor, and the risk of damage to the element constituting the circuit is reduced. However, since the wiper motor temporarily stops rotating at a position at which the wiper blade is inverted, there is a case in which the surge cannot be spent by the rotation of the motor, and the element constituting the circuit may be damaged by the high voltage.

The surge can be eliminated by adding a surge countermeasure Zener diode to the circuit. However, Zener diodes capable of coping with high voltage and large current are generally expensive, and there is a risk that the manufacturing cost of the product will be increased.

Japanese Patent Application Laid-Open (JP-A) No. 2015-205574 discloses a control for eliminating overvoltage due to a surge by energizing terminals of the winding of a motor so as to rotate a wiper motor (hereinafter abbreviated as a "motor") forward and backward at minute intervals of m seconds.

SUMMARY OF INVENTION

Technical Problem

FIG. 9 shows one mode of energization for rotating a motor forward and backward at minute intervals. FIG. 9 shows one mode of surge elimination energization executed in one control cycle of a control circuit. In FIG. 9, after a CW energization St11 for rotating the motor forward is executed, a dead time St12 for turning off the energization is provided, a CCW energization St13 for rotating the wiper motor backward is executed, and then a dead time St14 for turning off the energization is provided. The dead time St12 and the dead time St14 are provided for preventing switching elements connected in series from being turned on at the same time between a positive electrode (B terminal) side of a battery and a ground region, thereby protecting the switching elements.

However, since the dead time St12 and the dead time St14 are extremely short time of m seconds or less, it is difficult to completely eliminate the influence of the CW energization St11 and the CCW energization St13. FIGS. 10A, 10B, 10C, and 10D show an example of a current generated in switching elements and a motor M in the cases of the CW energization St11, the dead time St12, the CCW energization St13, and the dead time St14, respectively.

As shown in FIG. 10A, in the CW energization St11, the transistors T1 and T4 that are the switching elements are respectively turned on, so that the current is supplied from the first terminal M1 to the second terminal M2 of the motor M. In the dead time St12, as shown in FIG. 10B, the current that flows from the first terminal M1 to the second terminal M2 due to the internal power generation action of the motor M is observed. The current shown in FIG. 10B flows from the ground region to the positive electrode side of the battery via the freewheel diode of each of the transistor T2 and the transistor T3.

In addition, as shown in FIG. 10C, in the CCW energization St13, the transistors T2 and T3 that are the switching elements are respectively turned on, so that the current is supplied from the second terminal M2 to the first terminal M1 of the motor M. In the dead time St14, as shown in FIG. 10D, the current that flows from the second terminal M2 to the first terminal M1 by the internal power generation action of the motor M is observed. The current shown in FIG. 10B flows from the ground region to the positive electrode side of the battery via the freewheel diode of each of the transistor T1 and the transistor T4.

The problem is the current due to the internal power generation action of the motor M that is observed at each of the dead time St12 and the dead time St14. FIG. 11 shows an example of the waveform of the energization during the surge elimination energization shown in FIG. 9. As shown in FIG. 11, the phenomenon of counter electromotive force in which the current having a polarity opposite to that of energization to the motor M is generated is observed at the dead time St12 and the dead time St14. The counter electromotive force at the dead time St12 causes a torque opposite to that at the time of the CW energization St11 at the output shaft of the motor M, and torque ripple is generated such that the rotation of the output shaft of the motor vibrates against the intention. When the CCW energization St13 in the direction opposite to the CW energization St11 is executed in such a state, the torque ripple of the output shaft of the motor M becomes more prominent and a user may be notified of the sound and vibration caused by the torque ripple.

The present disclosure has been made in view of the above circumstances, and provides a motor control device and a motor control program, capable of eliminating a surge while suppressing a torque change of an output shaft of a motor.

Solution to Problem

In order to solve the above problems, a motor control device of a first aspect includes: a driving unit that supplies a driving voltage to a motor so as to rotate the motor in a predetermined direction and in a direction opposite to the predetermined direction; a voltage detection unit that detects a voltage of a circuit including the driving unit; and a control unit that has the driving unit execute a voltage drop control that lowers a voltage of the circuit by supplying the driving voltage to the motor and stopping the supply of the driving voltage in a predetermined manner, in a case in which a voltage that is equal to or higher than a threshold voltage is detected by the voltage detection unit in a state in which the motor is not being driven.

According to the motor control device, the surge can be eliminated by lowering the voltage of the circuit while suppressing the torque change in the output shaft of the motor by supplying the driving voltage for rotating the motor in the predetermined direction and in the direction opposite to the predetermined direction and stopping the supply of the driving voltage in a predetermined manner.

The motor control device of a second aspect is the motor control device of the first aspect, wherein: the driving unit comprises a plurality of switching elements, the driving unit generates the driving voltage in accordance with an on or off state of the plurality of switching elements, and the control unit controls the driving unit by turning the plurality of switching elements on or off, so as to execute the voltage drop control for at least one cycle, each cycle of the voltage drop control having: a first voltage supply period that has the motor rotate in the predetermined direction, a first voltage stop period that stops voltage supply to the motor after the first voltage supply period, a second voltage supply period that has the motor rotate in the direction opposite to the predetermined direction after the first voltage stop period, and a second voltage stop period that stops voltage supply to the motor after the second voltage supply period.

According to the motor control device, after the voltage for rotating the motor in the predetermined direction is generated, the phenomenon of counter electromotive force occurs in the motor, but the current generated by the counter electromotive force is eliminated by stopping the voltage generation by turning off all the switching elements following the voltage generation. After the current generated by the counter electromotive force is eliminated, the voltage for rotating the motor in the direction opposite to the predetermined direction is generated and applied to the terminal of the winding of the motor, and thus, it is possible to eliminate the surge while suppressing the torque change in the output shaft of the motor.

After the voltage for rotating the motor in the direction opposite to the predetermined direction is generated, the current generated by the counter electromotive force is eliminated by turning off all the switching elements and stopping the voltage generation. Therefore, the surge can be eliminated while suppressing the torque change in the output shaft of the motor.

The motor control device of a third aspect is the motor control device of the second aspect, wherein: each of the switching elements is a field effect transistor in which a freewheel diode is connected between a source and a drain, and the control unit performs the voltage drop control such that: a first portion of the plurality of switching elements, which generate a voltage that has the motor rotate in the predetermined direction, are turned on in the first voltage supply period, all the switching elements are turned off in the first voltage stop period, a second portion of the plurality of switching elements, which generate a voltage that has the motor rotate in the direction opposite to the predetermined direction, are turned on in the second voltage supply period, and all the plurality of switching elements are turned off in the second voltage stop period.

According to the motor control device, it is possible to easily control each of the first voltage supply period, the first voltage stop period, the second voltage supply period, and the second voltage stop period by using the field effect transistor whose on and off state is easily controlled by the switching element.

The motor control device of a fourth aspect is the motor control device of the second or the third aspect, wherein a dead time period is provided between the first voltage supply period and the first voltage stop period, between the first voltage stop period and the second voltage supply period, and between the second voltage supply period and the second voltage stop period.

According to the motor control device, it is possible to prevent simultaneous turning-on of the switching elements connected in series, when the polarity of the voltage generated by the driving unit is switched, by setting the dead time for turning off all the switching elements after the period for supplying the voltage to the motor.

The motor control device of a fifth aspect is the motor control device of any of the second to the fourth aspects, wherein: a time length of the first voltage stop period is a time length that eliminates current that is generated inside the motor after the first voltage supply period and that flows into the motor and the driving unit through freewheel diodes of the plurality of switching elements, and a time length of the second voltage stop period is a time length that eliminates current that is generated inside the motor after the second voltage supply period and that flows into the motor and the driving unit through the freewheel diodes of the plurality of switching elements.

According to the motor control device, the torque change in the output shaft of the motor can be suppressed by stopping the voltage supply to the motor in the time for which the current due to the counter electromotive force can be eliminated.

The motor control device of a sixth aspect is the motor control device of any of the second to the fifth aspects, wherein the control unit performs control in a predetermined control cycle, in which the control unit starts the execution of one cycle of the voltage drop control at a time at which one control cycle starts, and completes the execution of the one cycle of the voltage drop control at a time at which the one control cycle ends.

According to the motor control device, one cycle of the voltage drop control is performed according to the start and end of one control cycle. Therefore, the voltage drop control can be performed in synchronization with the control cycle.

The motor control device of a seventh aspect is the motor control device of the sixth aspect, wherein the control unit has the driving unit control each of the first voltage supply period, the first voltage stop period, the second voltage supply period, and the second voltage stop period, in respective time periods, the respective time periods being set by dividing the one control cycle equally by four.

According to the motor control device, it is possible to easily set the time distribution of each step of the voltage drop control by dividing the control cycle equally and allocating each step of the voltage drop control.

The motor control device of an eighth aspect is the motor control device of any of the second to the seventh aspects, wherein, in a case in which a voltage that is equal to or higher than a threshold voltage is detected by the voltage detection unit in a state in which the motor is not being driven, the control unit performs the voltage drop control at a time at which a next control cycle starts.

According to the motor control device, the voltage drop control can be performed according to the main timer.

The motor control device of a ninth aspect is the motor control device of any of the second to the seventh aspects, wherein, in a case in which a voltage that is equal to or higher than a threshold voltage is detected by the voltage detection unit in a state in which the motor is not being driven, the control unit immediately performs the voltage drop control by interruption processing.

According to the motor control device, when the surge occurs, the voltage drop control can be immediately performed by the interruption processing. Therefore, the circuit can be rapidly protected.

In order to solve the above problems, a motor control program of a tenth aspect is executable by a computer to perform a process. The process includes: by the driving unit, generating a driving voltage that causes a motor to rotate in a predetermined direction and in a direction opposite to the predetermined direction; and by the driving unit, performing a voltage drop control that lowers a voltage of a circuit including the driving unit by supplying a driving voltage to a motor and stopping the supply of the driving voltage in a predetermined manner, in a case in which a voltage that is equal to or higher than a threshold voltage is detected by a voltage detection unit in a state in which the motor is not being driven.

According to the motor control program, the surge can be eliminated by lowering the voltage of the circuit while suppressing the torque change in the output shaft of the motor by supplying the driving voltage for rotating the motor in the predetermined direction and in the direction opposite to the predetermined direction and stopping the supply of the driving voltage in a predetermined manner.

The motor control program of an eleventh aspect is the motor control program of the tenth aspect, wherein the voltage drop control controls the driving unit by turning a plurality of switching elements of the driving unit on or off, so as to execute the voltage drop control for at least one cycle, each cycle of the voltage drop control having: a first voltage supply period that has the motor rotate in the predetermined direction, a first voltage stop period that stops voltage supply to the motor after the first voltage supply period, a second voltage supply period that has the motor rotate in the direction opposite to the predetermined direction after the first voltage stop period, and a second voltage stop period that stops voltage supply to the motor after the second voltage supply period.

According to the motor control program, after the voltage for rotating the motor in the predetermined direction is generated, the phenomenon of counter electromotive force occurs in the motor, but the current generated by the counter electromotive force is eliminated by stopping the voltage generation by turning off all the switching elements following the voltage generation. After the current generated by the counter electromotive force is eliminated, the voltage for rotating the motor in the direction opposite to the predetermined direction is generated and applied to the terminal of the winding of the motor, and thus, it is possible to eliminate the surge while suppressing the torque change in the output shaft of the motor.

In addition, after the voltage for rotating the motor in the direction opposite to the predetermined direction is generated, the current generated by the counter electromotive force is eliminated by stopping the voltage generation by turning off all the switching elements again. Therefore, after that, when the voltage for rotating the motor in the predetermined direction is generated and applied to the terminal of the winding of the motor, the surge can be eliminated while suppressing the torque change in the output shaft of the motor.

The motor control program of a twelfth aspect is the motor control program of the eleventh aspect, wherein: each of the switching elements is a field effect transistor in which a freewheel diode is connected between a source and a drain, and the voltage drop control is performed such that: a first portion of the plurality of switching elements, which generate a voltage that has the motor rotate in the predetermined direction, are turned on in the first voltage supply period, all the switching elements are turned off in the first voltage stop period, a second portion of the plurality of switching elements, which generate a voltage that has the motor rotate in the direction opposite to the predetermined direction, are turned on in the second voltage supply period, and all the plurality of switching elements are turned off in the second voltage stop period.

According to the motor control program, it is possible to easily control each of the first voltage supply period, the first voltage stop period, the second voltage supply period, and the second voltage stop period by using the field effect transistor whose on and off state is easily controlled by the switching element.

The motor control program of a thirteenth aspect is the motor control program of the eleventh or the twelfth aspect, wherein a dead time period is provided between the first voltage supply period and the first voltage stop period, between the first voltage stop period and the second voltage supply period, and between the second voltage supply period and the second voltage stop period.

According to the motor control program, it is possible to prevent simultaneous turning-on of the switching elements connected in series, when the polarity of the voltage generated by the driving unit is switched, by setting the dead time for turning off all the switching elements after the period for supplying the voltage to the motor.

The motor control program of a fourteenth aspect is the motor control program of any of the eleventh to the thirteenth aspect, wherein: a time length of the first voltage stop period is a time length that eliminates current that is generated inside the motor after the first voltage supply period and that flows into the motor and the driving unit through freewheel diodes of the plurality of switching elements, and a time length of the second voltage stop period is a time that eliminates current that is generated inside the motor after the second voltage supply period and that flows into the motor and the driving unit through the freewheel diodes of the plurality of switching elements.

According to the motor control program, the torque change in the output shaft of the motor can be suppressed by stopping the voltage supply to the motor in the time for which the current due to the counter electromotive force can be eliminated.

The motor control program of a fifteenth aspect is the motor control program of any of the eleventh to the fourteenth aspects, wherein the execution of one cycle of the voltage drop control starts at a time at which one control cycle of the computer starts, and the execution of the one cycle of the voltage drop control is completed at a time at which the one control cycle ends.

According to the motor control program, one cycle of the voltage drop control is performed according to the start and end of one control cycle. Therefore, the voltage drop control can be performed in synchronization with the control cycle.

The motor control program of a sixteenth aspect is the motor control program of the fifteenth aspect, wherein the voltage drop control controls each of the first voltage supply period, the first voltage stop period, the second voltage supply period, and the second voltage stop period, in respective time periods, the respective time periods being set by dividing the one control cycle equally by four.

It is possible to easily set the time distribution of each step of the voltage drop control by dividing the control cycle substantially equally and allocating each step of the voltage drop control.

The motor control program of a seventeenth aspect is the motor control program of any of the eleventh to the sixteenth aspects, wherein, in a case in which a voltage that is equal to or higher than a threshold voltage is detected by the voltage detection unit in a state in which the motor is not being driven in a current control cycle, the voltage drop control is performed at a time at which a next control period starts.

According to the motor control program, the voltage drop control can be performed according to the main timer.

The motor control program of an eighteenth aspect is the motor control program of any of the eleventh to the sixteenth aspects, wherein, in a case in which a voltage that is equal to or higher than a threshold voltage is detected by the voltage detection unit in a state in which the motor is not being driven, the voltage drop control is immediately performed by interruption processing.

According to the motor control program, when the surge occurs, the voltage drop control can be immediately performed by the interruption processing. Therefore, the circuit can be rapidly protected.

DESCRIPTION OF EMBODIMENTS

Figure 1:
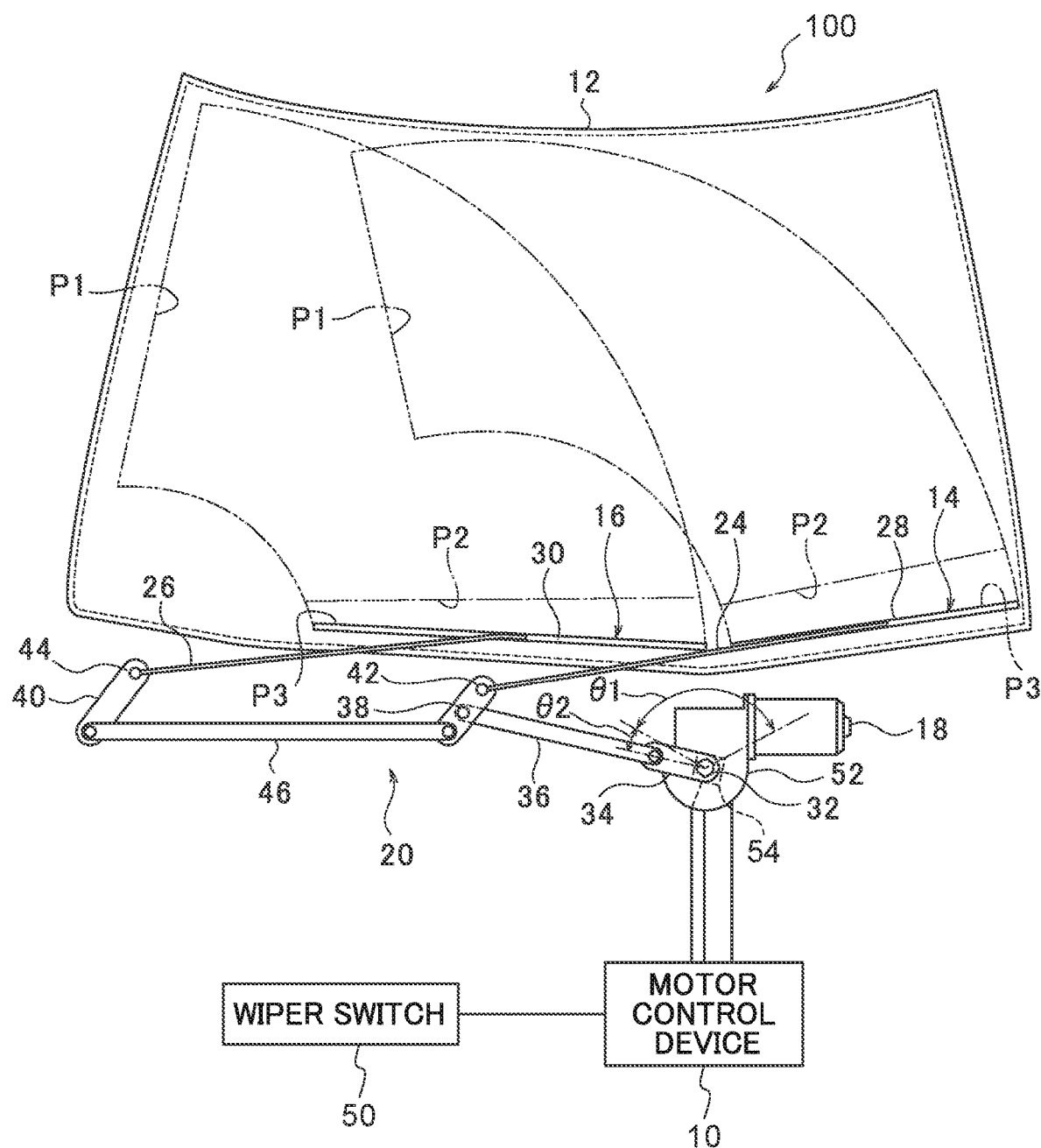
FIG. 1 is a schematic diagram showing an example of a configuration of a wiper apparatus including a motor control device according to an embodiment of the present disclosure.

FIG. 1 is a schematic diagram showing an example of a configuration of a wiper apparatus 100 including a motor control device 10 according to the present embodiment. The wiper apparatus 100 is provided for wiping a windshield glass 12 provided in, for example, a vehicle such as a passenger car, and includes a pair of wipers 14 and 16, a motor 18, a link mechanism 20, and a motor control device 10.

The wipers 14 and 16 are constituted by wiper arms 24 and 26 and wiper blades 28 and 30, respectively. Base ends of the wiper arms 24 and 26 are respectively fixed to pivot shafts 42 and 44 described later, and the wiper blades 28 and 30 are respectively fixed to the tip end portions of the wiper arms 24 and 26, respectively.

In the wipers 14 and 16, the wiper blades 28 and 30 reciprocate on the windshield glass 12 as the wiper arms 24 and 26 operate, and the wiper blades 28 and 30 wipe the windshield glass 12.

The motor 18 includes an output shaft 32 that can rotate forward and backward through a deceleration mechanism 52 mainly constituted by a worm gear. The link mechanism 20 includes a crank arm 34, a first link rod 36, a pair of pivot levers 38 and 40, a pair of pivot shafts 42 and 44, and a second link rod 46.

One end side of the crank arm 34 is fixed to the output shaft 32, and the other end side of the crank arm 34 is operatively connected to one end side of the first link rod 36. In addition, the other end side of the first link rod 36 is operatively connected to a position closer to the end different from the end having the pivot shaft 42 of the pivot lever 38, and both ends of the second link rod 46 are operatively connected to the end different from the end having the pivot shaft 42 of the pivot lever 38 and the end of the pivot lever 40 corresponding to the end of the pivot lever 38.

In addition, the pivot shafts 42 and 44 are operatively supported by a pivot holder provided in a vehicle body, and the ends of the pivot levers 38 and 40 having the pivot shafts 42 and 44 are respectively fixed to the wiper arms 24 and 26 through the pivot shafts 42 and 44.

In the wiper apparatus 100 including the motor control device 10 according to the present embodiment, when the output shaft 32 rotates forward and backward at a rotation angle $\theta 1$ within a predetermined range, the rotational force of the output shaft 32 is transmitted to the wiper arms 24 and 26 through the link mechanism 20. As the wiper arms 24 and 26 reciprocate, the wiper blades 28 and 30 reciprocate between a lower reversal position P2 and an upper reversal position P1 on the windshield glass 12. The value of $\theta 1$ can take various values depending on the configuration of the link mechanism of the wiper apparatus 100 or the like, but in the present embodiment, the value of $\theta 1$ is 140° as an example.

In the wiper apparatus 100 including the motor control device 10 according to the present embodiment, as shown in FIG. 1, when the wiper blades 28 and 30 are located at storage positions P3, the crank arm 34 and the first link rod 36 form a straight line shape.

The storage position P3 is provided below the lower reversal position P2. As the output shaft 32 rotates by $\theta 2$ from the state in which the wiper blades 28 and 30 are in the lower reversal positions P2, the wiper blades 28 and 30 are moved to the storage positions P3. The value of θ2 can take various values depending on the configuration of the link mechanism of the wiper apparatus or the like, but in the present embodiment, the value of θ2 is 10° as an example.

When θ2 is "0", the lower reversal position P2 coincides with the storage position P3, and the wiper blades 28 and 30 are stopped at the lower reversal positions P2 and stored.

The motor control device 10 for controlling the rotation of the motor 18 is connected to the motor 18. The motor control device 10 according to the present embodiment controls the rotational speed of the motor 18 based on a detection result of a rotational angle sensor 54 that detects the rotational speed and the rotational angle of the output shaft 32 of the motor 18. The rotational angle sensor 54 is provided in the deceleration mechanism 52 of the motor 18 and performs detection by converting a magnetic field (magnetic force) of a sensor magnet rotating in conjunction with the output shaft 32 into a current.

Since the motor 18 according to the present embodiment includes the deceleration mechanism 52 as described above, the rotational speed and the rotational angle of the output shaft 32 are not the same as the rotational speed and rotational angle of the wiper motor body. However, in the present embodiment, since the wiper motor body and the deceleration mechanism 52 are integrally formed, it is assumed that the rotational speed and the rotational angle of the output shaft 32 are regarded as the rotational speed and the rotational angle of the motor 18.

The motor control device 10 controls the rotational speed of the motor 18 such that the rotational speed of the output shaft 32 is changed according to the position at which the positions of the wiper blades 28 and 30 on the windshield glass 12 can be calculated from the rotational angle of the output shaft 32 detected by the rotational angle sensor 54.

In addition, a wiper switch 50 that turns on or off the power supplied to the motor 18 from the vehicle battery that is the power source, to the motor 18 is connected to the motor control device 10. The wiper switch 50 can switch the wiper blades 28 and 30 to a low speed operation mode selection position for operating at a low speed, a high speed operation mode selection position for operating at a high speed, an intermittent operation mode selection position for intermittently operating at a constant cycle, or a storage (stop) mode selection position. In addition, a signal of a command of the rotational speed corresponding to the selected position of each mode is output to the motor control device 10.

When the signal output from the wiper switch 50 according to the selected position of each mode is input to the motor control device 10, the motor control device 10 performs control corresponding to the output signal from the wiper switch 50.

Figure 2:
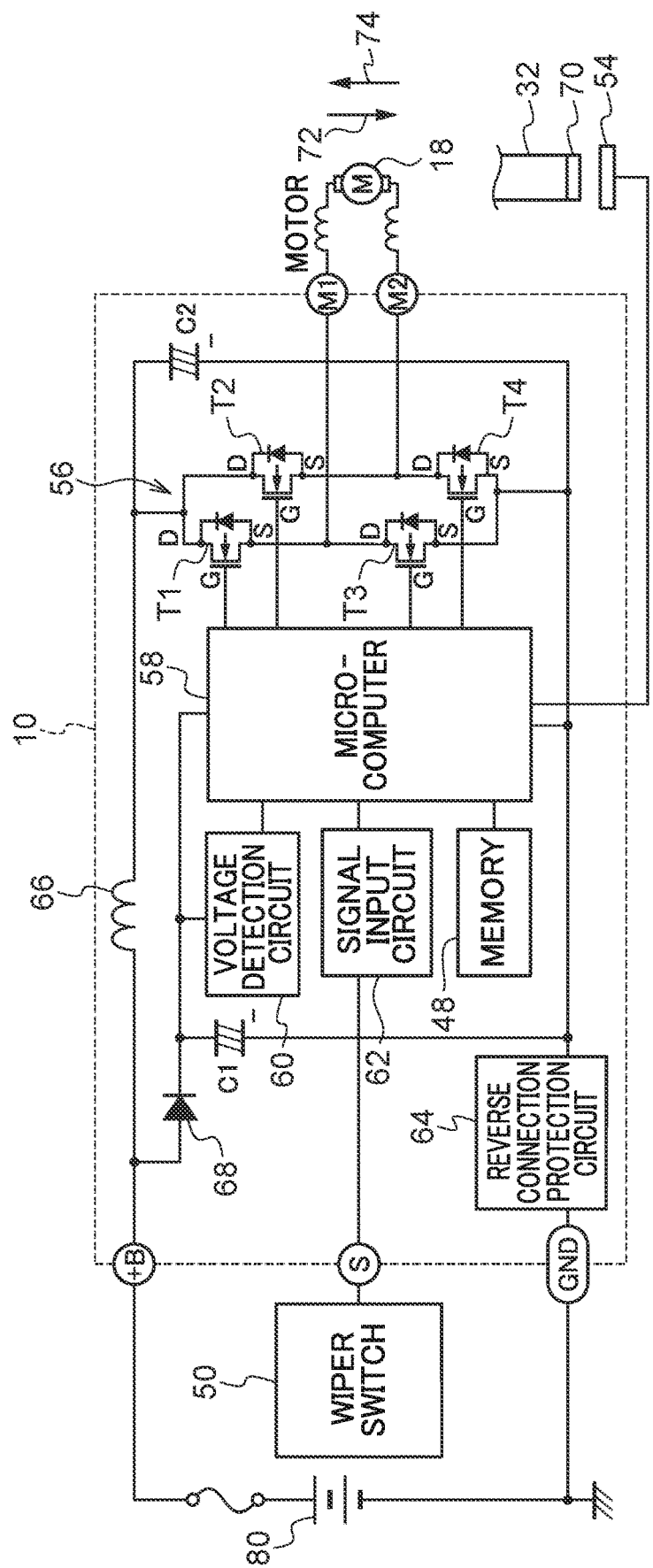
FIG. 2 is a block diagram showing an example of a schematic configuration of the motor control device according to an embodiment of the present disclosure.

FIG. 2 is a block diagram showing an example of a schematic configuration of the motor control device 10 according to the present embodiment. In addition, as an example, the motor 18 shown in FIG. 2 is a DC motor with a brush.

The motor control device 10 shown in FIG. 2 includes a driving circuit 56 that generates a voltage to be applied to a winding terminal of the motor 18, and a microcomputer 58 that controls on and off of the switching elements constituting the driving circuit 56. The driving circuit 56 is an example of a driving unit. Power of a battery 80 is supplied to the microcomputer 58 through a diode 68. The voltage of the supplied power is detected by a voltage detection circuit 60 provided between the diode 68 and the microcomputer 58. The detection result is output to the microcomputer 58.

The voltage detection circuit 60 is an example of a voltage detection unit. In addition, an electrolytic capacitor C1 having one end connected between the diode 68 and the microcomputer 58 and the other end (−) grounded is provided. The electrolytic capacitor C1 is a capacitor for stabilizing the power supply of the microcomputer 58. The electrolytic capacitor C1 protects the microcomputer 58 by accumulating a sudden high voltage such as a surge and bypassing the same to a ground region.

A signal for instructing the rotational speed of the motor 18 is input from the wiper switch 50 to the microcomputer 58 through the signal input circuit 62. When the signal output from the wiper switch 50 is an analog signal, the signal is digitized in the signal input circuit 62 and input to the microcomputer 58.

In addition, the rotational angle sensor 54 for detecting the magnetic field of the sensor magnet 70 that changes according to the rotation of the output shaft 32 is connected to the microcomputer 58. The microcomputer 58 determines the positions of the wiper blades 28 and 30 on the windshield glass 12 by calculating the rotational angle of the output shaft based on the signal output by the rotational angle sensor 54.

Further, the microcomputer 58 controls the driving circuit 56 such that the rotation of the motor 18 has the number of revolutions corresponding to the specified positions of the wiper blades 28 and 30, with reference to the data of the rotational speed of the motor 18 defined according to the positions of the wiper blades 28 and 30 stored in the memory 48.

As shown in FIG. 2, the driving circuit 56 uses transistors T1, T2, T3, and T4, which are N-type field effect transistors (FETs), as the switching elements. The drains of the transistors T1 and T2 are connected to the battery 80 through a noise prevention coil 66, and the sources thereof are connected to the drains of the transistors T3 and the transistor T4, respectively. In addition, the sources of the transistors T3 and T4 are grounded.

The source of the transistor T1 and the drain of the transistor T3 are connected to one end of the winding of the motor 18, and the source of the transistor T2 and the drain of the transistor T4 are connected to the other end of the winding of the motor 18.

Since a high level signal is input to the gates of the transistors T1 and T4, the transistors T1 and T4 are turned on, and for example, a CW current 72 for operating the wiper blades 28 and 30 in a clockwise direction when seen from the vehicle interior side flows through the motor 18. Further, when one of the transistor T1 and the transistor T4 is on-controlled, the other is subjected to on/off control in a small increment by pulse width modulation (PWM) control, whereby the voltage of the CW current 72 can be modulated.

In addition, since a high level signal is input to the gates of the transistors T2 and T3, the transistor T2 and the transistor T3 are turned on, and for example, a CCW current 74 for operating the wiper blades 28 and 30 in a counterclockwise direction when seen from the vehicle interior side flows through the motor 18. Further, when one of the transistor T2 and the transistor T3 is on-controlled, the other is subjected to on/off control in a small increment by PWM control, whereby the voltage of the CCW current 74 can be modulated.

In the present embodiment, a reverse connection protection circuit 64 and a noise prevention coil 66 are provided between the battery 80, which is the power supply, and the driving circuit 56, and an electrolytic capacitor C2 is provided in parallel with the driving circuit 56. The noise prevention coil 66 is an element for suppressing noise generated by the switching of the driving circuit 56.

The electrolytic capacitor C2 is an element for alleviating noise generated from the driving circuit 56, storing a sudden high voltage such as a surge, and bypassing the same to the ground region so as to prevent an excessive current from being input to the high voltage driving circuit 56.

The reverse connection protection circuit 64 is a circuit for protecting elements constituting the motor control device 10 when a positive electrode and a negative electrode of the battery 80 are connected in reverse to the case shown in FIG. 2. As an example, the reverse connection protection circuit 64 includes a so-called diode-connected FET or the like in which the drain thereof is connected to the gate thereof.

Figure 3:
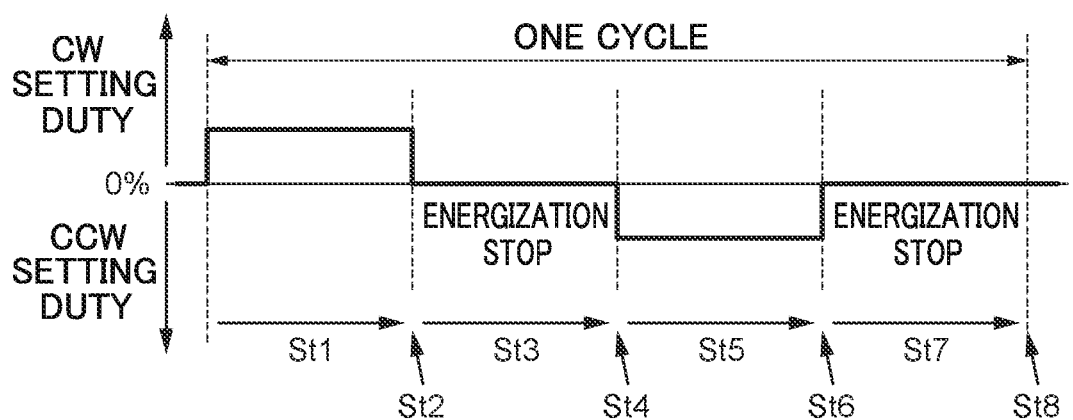
FIG. 3 shows one mode of surge elimination energization executed in one control cycle of a microcomputer of the motor control device according to an embodiment of the present disclosure.

Hereinafter, the function and effect of the motor control device 10 according to the present embodiment will be described. FIG. 3 shows one mode of surge elimination energization executed in one control cycle of the microcomputer 58 of the motor control device 10 according to the present embodiment. As shown in FIG. 3, in the surge elimination energization according to the present embodiment, the supply and the supply stop of the driving voltage for rotating the motor 18 in a predetermined direction and in a direction opposite to the predetermined direction to the motor 18 are executed in a predetermined manner. Specifically, after the CW energization St1 for rotating the motor 18 forward, the energization stop St3 for continuing the energization OFF for a predetermined time is executed after passing the dead time St2 for turning off the energization.

After the energization stop St3, the dead time St6 for turning off the energization is provided after the CCW energization St5 for rotating the motor 18 backward through the dead time St4 for turning off the energization. Subsequent to the dead time St6, the dead time St8 is executed after the energization stop St7 for continuing the energization OFF for a predetermined time is executed.

Each of the dead times St2, St4, St6, and St8 is generally accompanied by the control of the microcomputer 58 that is the control circuit, and is the process of turning off the energization in an extremely short time of m seconds or less.

The surge elimination energization shown in FIG. 3 is executed when the motor 18 does not cause the wiper blades 28 and 30 of the wiper apparatus 100 to perform the wiping operation, that is, when the motor control device 10 does not cause the driving circuit 56 to generate the voltage for driving the motor 18. Even when the surge occurs, if the motor 18 is rotating, overvoltage due to the surge is spent by the rotation of the rotating motor 18, and the risk of damage to the elements constituting the circuit is reduced.

When the motor control device 10 does not cause the driving circuit 56 to generate the voltage for driving the motor 18, the state in which the wiper switch 50 is off is representative, but the present disclosure is not limited thereto. Even when the wiper switch 50 is on, the motor 18 temporarily stops rotating at the position at which the wiper blades 28 and 30 are reversed. Therefore, in this case, although in a short time, it is included in a case in which the motor control device 10 does not cause the driving circuit 56 to generate the voltage for driving the motor 18.

FIGS. 4A, 4B, 4C, and 4D show an example of a current generated in switching elements and a motor 18 in the cases of the CW energization St1, the dead time St2, the energization stop St3, and the dead time St4, respectively.

Figure 4A:
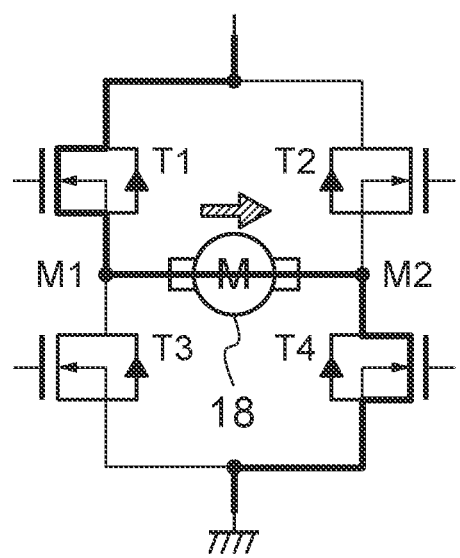
FIG. 4A shows an example of a current generated in switching elements and a motor 18 by CW energization.
Figure 4B:
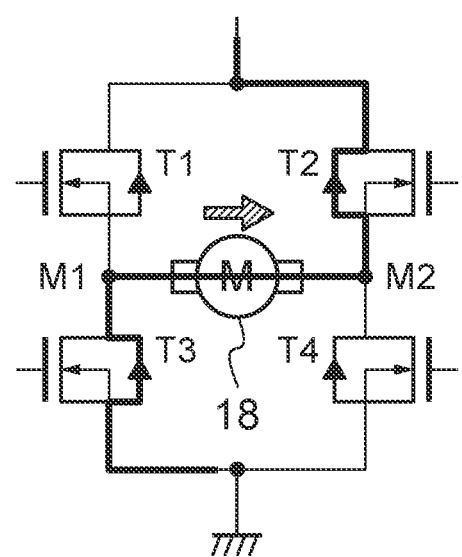
FIG. 4B shows an example of a current generated in switching elements and a motor 18 at a dead time.

As shown in FIG. 4A, in the CW energization St1, transistors T1 and T4 that are the switching elements are respectively turned on, so that current is supplied from a first terminal M1 to a second terminal M2 of the motor 18. In the dead time St2, as shown in FIG. 4B, the current that flows from the first terminal M1 to the second terminal M2 by the internal power generation action of the motor 18 is observed. A current shown in FIG. 4B flows from a ground region to a positive electrode side of a battery via a freewheel diode of each of a transistor T2 and a transistor T3.

Figure 4C:
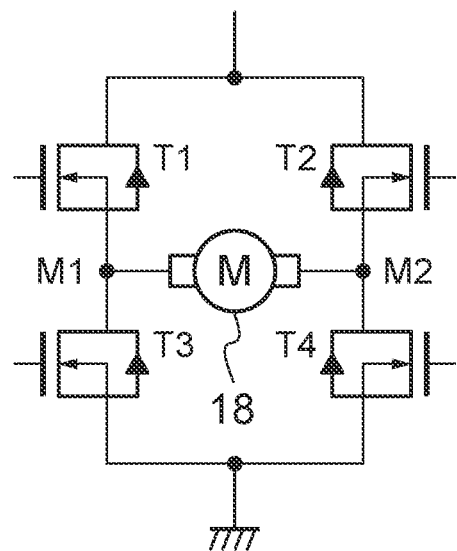
FIG. 4C shows an example of a current generated in switching elements and a motor 18 when energization is stopped.
Figure 4D:
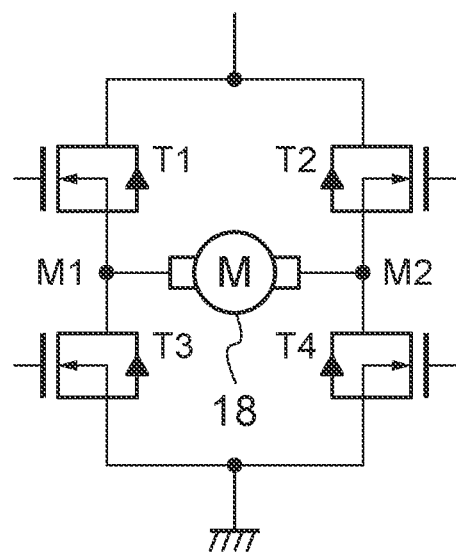
FIG. 4D shows an example of a current generated in switching elements and a motor 18 at a dead time.

However, as shown in FIG. 4C, in the energization stop St3, since all the switching elements are turned off in a time sufficient to eliminate the current due to the internal power generation action of the motor 18, the current observed at the dead time St2 is eliminated. FIG. 4D shows the state at the dead time St4. However, since the current due to the internal power generation action of the motor 18 is eliminated at the energization stop St3, the current is not also observed at the dead time St4.

FIGS. 5A, 5B, 5C, and 5D show an example of a current generated in switching elements and a motor 18 in the cases of the CCW energization St5, the dead time St6, the energization stop St7, and the dead time St8, respectively.

Figure 5A:
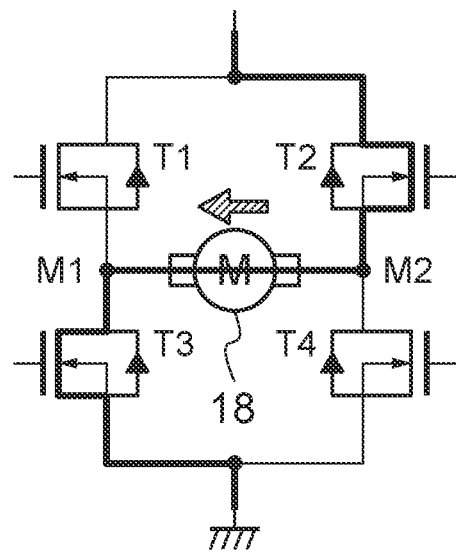
FIG. 5A shows an example of a current generated in switching elements and a motor by CCW energization.
Figure 5B:
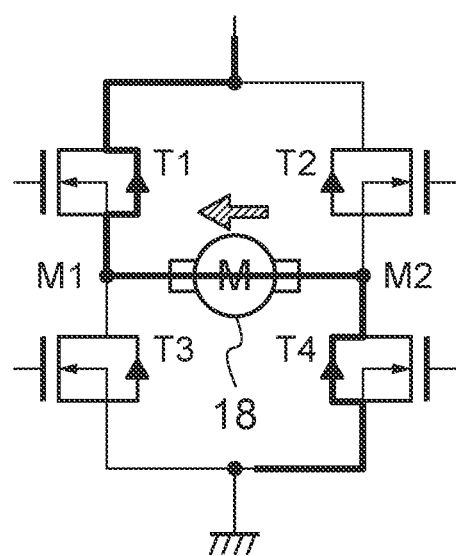
FIG. 5B shows an example of a current generated in switching elements and a motor at a dead time.

As shown in FIG. 5A, in the CCW energization St5, transistors T2 and T3 that are the switching elements are respectively turned on, so that current is supplied from a second terminal M2 to a first terminal M1 of the motor 18. In the dead time St6, as shown in FIG. 5B, the current that flows from the second terminal M2 to the first terminal M1 by the internal power generation action of the motor 18 is observed. The current shown in FIG. 5B flows from the ground region to the positive electrode side of the battery via the freewheel diode of each of the transistor T1 and the transistor T4.

Figure 5C:
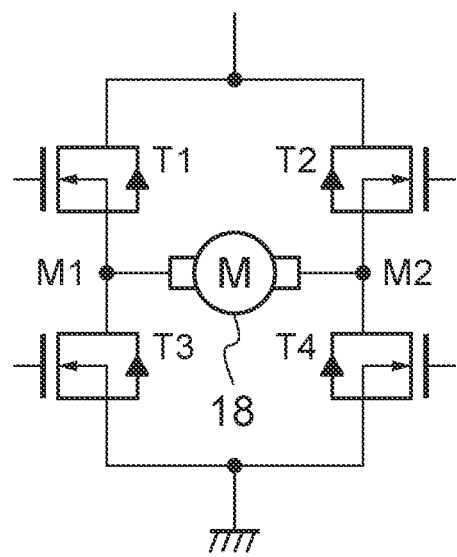
FIG. 5C shows an example of a current generated in switching elements and a motor when energization is stopped.
Figure 5D:
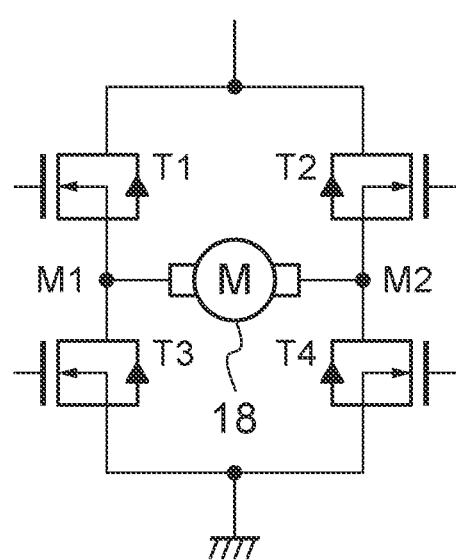
FIG. 5D shows an example of a current generated in switching elements and a motor at a dead time.

However, as shown in FIG. 5C, in the energization stop St7, since all the switching elements are turned off in a time sufficient to eliminate the current due to the internal power generation action of the motor 18, the current observed at the dead time St6 is eliminated. FIG. 5D shows the state at the dead time St8. However, since the current due to the internal power generation action of the motor 18 is eliminated at the energization stop St7, the current is not also observed at the dead time St8.

Since the CW energization St1 and the CCW energization St5 are energization for eliminating the surge, it is necessary to continue energization in a certain time. However, since it is also necessary to prevent the user from being aware that the motor 18 is operating, it is not recommended to prolong the energization time indefinitely. In the present embodiment, it is preferable that the CW energization St1 and the CCW energization St5 are the short time of m seconds. In addition, it is preferable that the energization stop St3 and St7 is the time that can eliminate the current caused by the internal power generation action of the motor 18, but if it is made unnecessarily long as compared to the CW energization St1 and the CCW energization St5, it is unlikely to eliminate the surge. As an example, the current due to the internal power generation action of the motor 18 is eliminated by executing the energization stop St3 and St7 in the same time as each of the CW energization St1 and the CCW energization St5.

In the present embodiment, as an example, the CW energization St1, the energization stop St3, the CCW energization St5, and the energization stop St7 are distributed in each time cycle set by dividing one control cycle of the microcomputer 58 into four equal parts with the dead times St2, St4, and St6 interposed therebetween.

Each unit of the surge elimination process can be executed in synchronization with the control cycle of the microcomputer 58 by storing the surge elimination process constituting one cycle including the CW energization St1, the energization stop St3, the CCW energization St5, and the energization stop St7 within one control cycle of the microcomputer 58. For example, it is possible to start the execution of one cycle of the surge elimination process together with the start of one control cycle and complete the execution of the one cycle of the surge elimination process together with the end of the one control cycle. After that, the surge elimination process can be executed in synchronization with the start of a new control cycle. In the present embodiment, the high voltage due to the surge is eliminated by executing the surge elimination process during at least one cycle.

The timing control of the start of the surge elimination process is performed by using a main timer of the microcomputer 58 as an example. When the main timer is used, in a case in which the surge occurs within the current control cycle, the execution of one cycle of the surge elimination process is started with the start of the next control cycle.

In addition, when the microcomputer 58 has a separate timer other than the main timer and can perform a so-called interruption processing, in a case in which the surge is detected, the surge elimination process can be immediately executed by the interruption processing, and the circuit can be rapidly protected. Even when the interruption processing is performed, it is possible to execute each unit of the surge elimination process in synchronization with the timer related to the interruption processing by storing one cycle of the surge elimination process in one control cycle of the timer related to the interruption processing.

Figure 6:
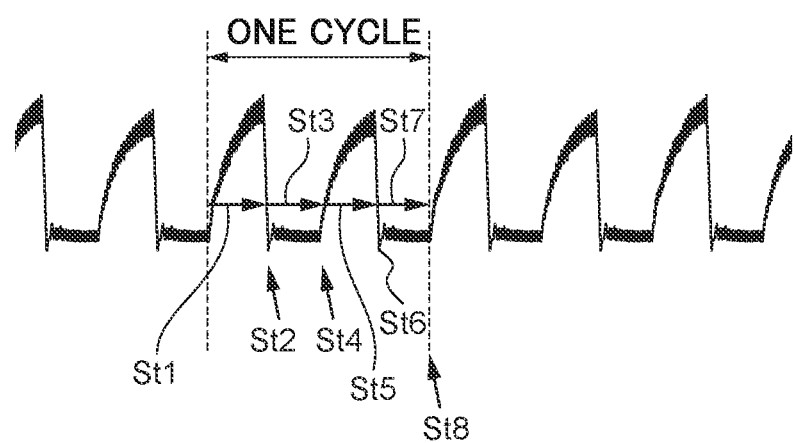
FIG. 6 shows an example of the waveform of the energization during the surge elimination energization shown in FIG. 3.

FIG. 6 shows an example of the waveform of the energization during the surge elimination energization shown in FIG. 3. As shown in FIG. 6, the phenomenon of counter electromotive force in which the current having a polarity opposite to that of the energization to the motor 18 is generated is observed at the dead time St2 after the CW energization St1. However, the phenomenon of the counter electromotive force is solved by the energization stop St3, and the current having the polarity opposite to the energization to the motor 18 such as the dead time St2 is not observed at the dead time St4.

In addition, the phenomenon of the counter electromotive force in which the current having the polarity opposite to that of the energization to the motor 18 is generated is observed at the dead time St6 after the CCW energization St5. However, the phenomenon of the counter electromotive force is solved by the energization stop St7, and the current having the polarity opposite to the energization to the motor 18 such as the dead time St6 is not observed at the dead time St8.

In the present embodiment, the current due to the internal power generation action of the motor 18 is observed at the dead time St2 after the CW energization St1, but the current is eliminated by the energization stop St3. In this state, when the CCW energization St5 in the direction opposite to the CW energization St1 is executed, the risk of occurrence of torque ripple on the output shaft of the motor M is reduced.

In addition, the current due to the internal power generation action of the motor 18 is observed at the dead time St6 after the CCW energization St5, but the current is eliminated by the energization stop St7. In this state, when the CW energization St1 in the direction opposite to the CCW energization St5 is executed, the risk of occurrence of torque ripple on the output shaft of the motor M is reduced.

Figure 7:
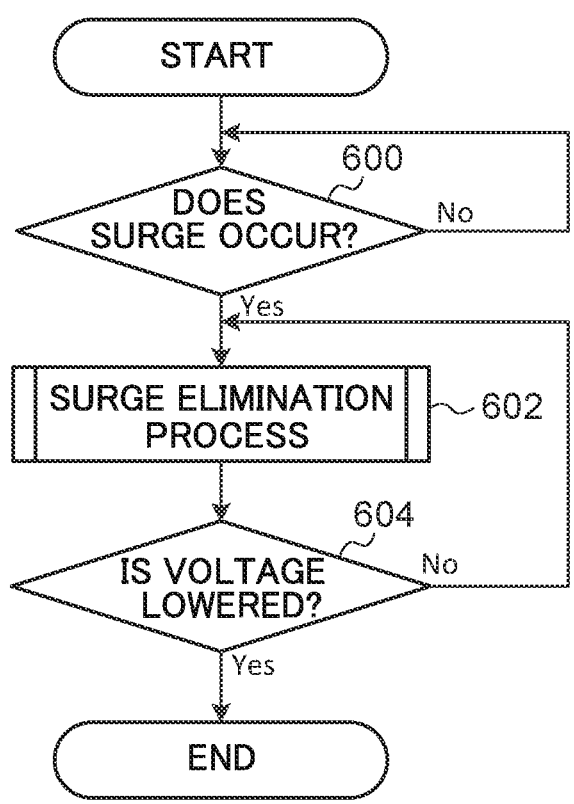
FIG. 7 is a flowchart showing an example of surge elimination energization control of the motor control device according to an embodiment of the present disclosure.

FIG. 7 is a flowchart showing an example of the surge elimination energization control of the motor control device 10 according to the present embodiment. In step 600, it is determined whether or not the surge has occurred. In the present embodiment, the voltage change is detected by the voltage detection circuit 60 shown in FIG. 2. When the voltage detected by the voltage detection circuit 60 is equal to or higher than a threshold voltage, an affirmative determination that the surge has occurred is made in step 600. When the circuit protection is prioritized, the threshold voltage should be set to be low. However, if the threshold voltage is set to be excessively low, the surge elimination energization control may be frequently executed, and thus, an optimum value is determined according to the specification or the like of the wiper apparatus 100.

When the affirmative determination is made at step 600, the surge elimination process is performed at step 602. In step 604, when the voltage detected by the voltage detection circuit 60 is less than the threshold voltage, an affirmative determination is made and the process is ended. When a negative determination is made in step 604, the procedure returns to step 602 to continue the surge elimination process of step 602.

Figure 8:
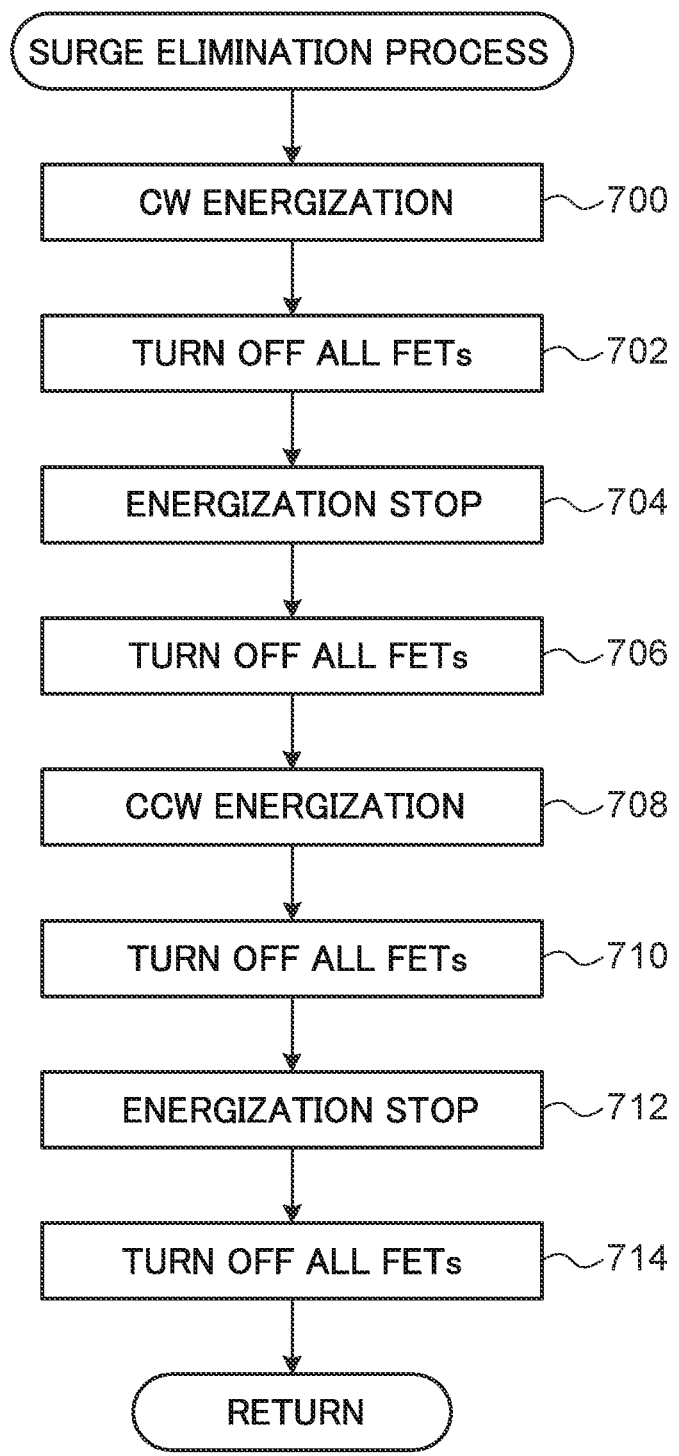
FIG. 8 is a flowchart showing an example of a surge elimination process in step 602 of FIG. 7.
Figure 9:
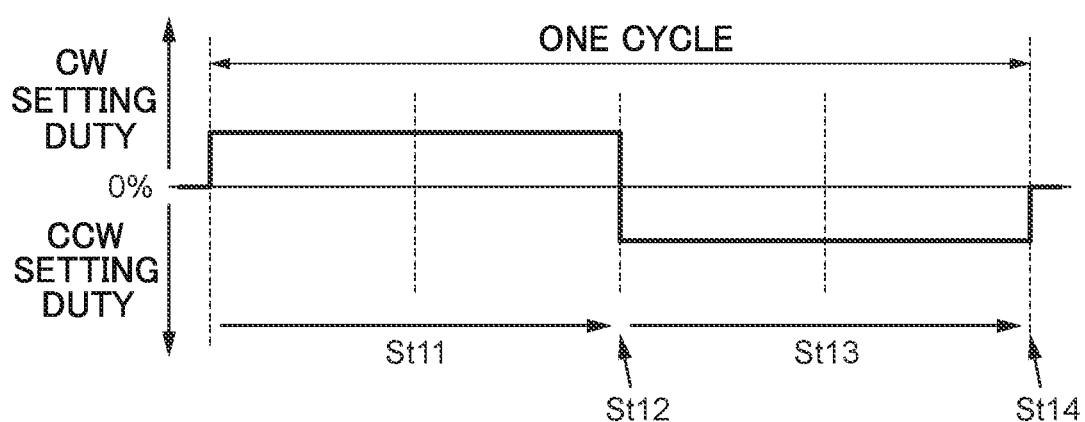
FIG. 9 shows one mode of surge elimination energization executed in one control cycle of a control circuit.
Figure 10A:
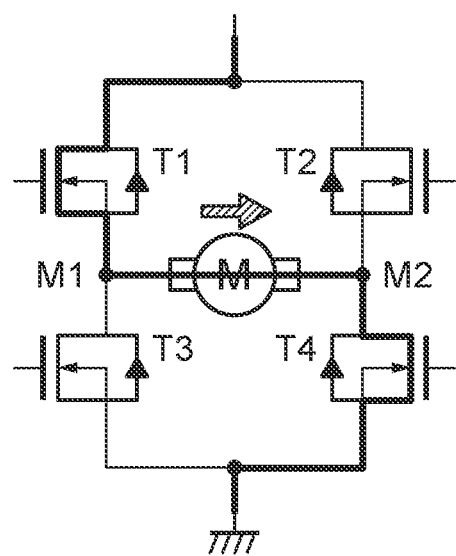
FIG. 10A shows an example of a current generated in switching elements and a motor by CW energization.
Figure 10B:
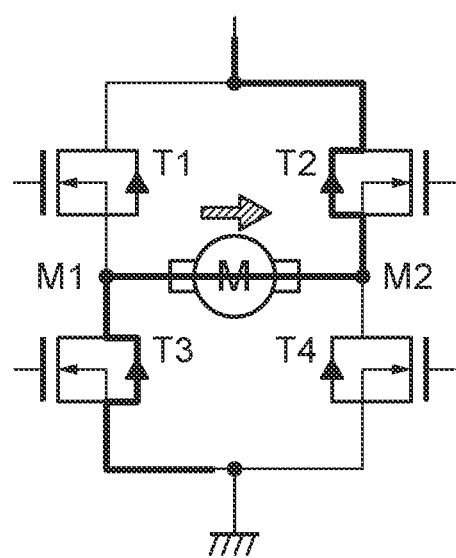
FIG. 10B shows an example of a current generated in switching elements and a motor at a dead time.
Figure 10C:
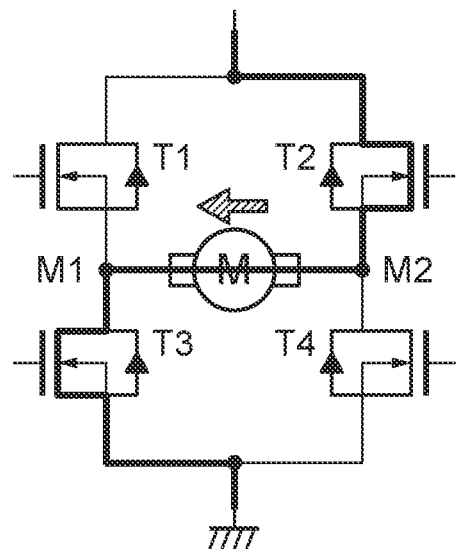
FIG. 10C shows an example of a current generated in switching elements and a motor by CCW energization.
Figure 10D:
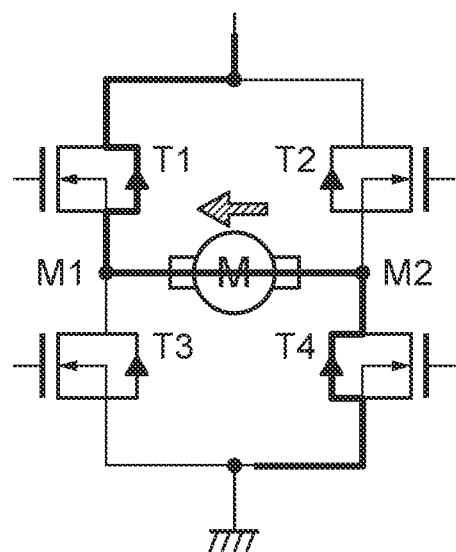
FIG. 10D shows an example of a current generated in switching elements and a motor at a dead time.
Figure 11:
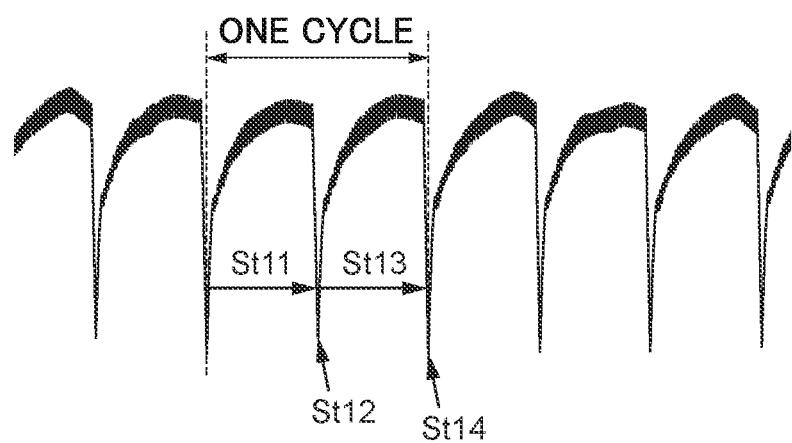
FIG. 11 shows an example of the waveform of the energization during the surge elimination energization shown in FIG. 9.

FIG. 8 is a flowchart showing an example of the surge elimination process in step 602 of FIG. 7. In step 700, the CW energization St1 is executed, and in step 702, all the switching elements are turned off by the dead time St2. In step 704, the energization stop St3 for turning off all the switching elements for a predetermined time is executed.

The CCW energization St5 is executed in step 708 subsequent to the dead time St4 of step 706. In step 710, all the switching elements are turned off by the dead time St6. In step 712, the energization stop St7 for turning off all the switching elements for a predetermined time is executed, and the process returns after the dead time St8 of step 714.

As described above, in the present embodiment, the phenomenon of the counter electromotive force is solved by executing the energization stop St3 for turning off all the switching elements after the CW energization St1 and the energization stop St7 for turning off all switching elements after the CCW energization St5, respectively. When the current related to the counter electromotive force does not remain in the motor 18 and the driving circuit 56, torque change hardly occurs on the output shaft of the motor 18 even when the CCW energization St5 having the polarity opposite to the CW energization St1 is executed after the CW energization St1. In addition, even when the CW energization St1 having the polarity opposite to the CCW energization St5 is executed after the CCW energization St5, torque change hardly occurs on the output shaft of the motor 18. As a result, it is possible to eliminate the surge while suppressing the torque change in the output shaft of the motor.

In addition, in the present embodiment, since a series of control can be performed by rewriting the control program of the microcomputer 58, it is not necessary to mount a separate part for eliminating the surge. As a result, it is possible to manufacture the motor control device 10 capable of avoiding the element damage due to the surge at a low cost.

The control program is stored in, for example, the memory 48, and the central processing unit (CPU) of the microcomputer 58 loads and executes the control program from the memory 48. Therefore, the CPU of the microcomputer 58 functions as the control unit. The control program may be stored in, for example, a non-transitory storage medium, such as a CD-ROM or a DVD, and loaded into the memory 48.

The disclosure of Japanese Patent Application No. 2016-068592, filed on Mar. 30, 2016, is incorporated herein by reference in its entirety.

The invention claimed is:

1. A motor control device comprising:
a driving unit including a plurality of switching elements, the driving unit being configured to (i) supply a driving voltage to a motor so as to rotate the motor in a predetermined direction and in a direction opposite to the predetermined direction, and (ii) generate the driving voltage in accordance with an on or off state of the plurality of switching elements;
a voltage detection unit that detects a voltage of a circuit including the driving unit; and
a control unit that controls the driving unit by turning the plurality of switching elements on or off, so as to execute a voltage drop control for at least one cycle that lowers a voltage of the circuit by supplying the driving voltage to the motor and stopping the supply of the driving voltage in a predetermined manner, in a case in which a voltage that is equal to or higher than a threshold voltage is detected by the voltage detection unit in a state in which the motor is not being driven, each cycle of the voltage drop control having:
a first voltage supply period that has the motor rotate in the predetermined direction,
a first voltage stop period that stops voltage supply to the motor after the first voltage supply period,
a second voltage supply period that has the motor rotate in the direction opposite to the predetermined direction after the first voltage stop period, and
a second voltage stop period that stops voltage supply to the motor after the second voltage supply period,
wherein a dead time period is provided between the first voltage supply period and the first voltage stop period, between the first voltage stop period and the second voltage supply period, and between the second voltage supply period and the second voltage stop period.

2. The motor control device according to claim 1, wherein:
each of the plurality of switching elements is a field effect transistor in which a freewheel diode is connected between a source and a drain, and
the control unit performs the voltage drop control such that:
a first portion of the plurality of switching elements, which generate a voltage that has the motor rotate in the predetermined direction, are turned on in the first voltage supply period,
all the plurality of switching elements are turned off in the first voltage stop period,
a second portion of the plurality of switching elements, which generate a voltage that has the motor rotate in the direction opposite to the predetermined direction, are turned on in the second voltage supply period, and
all the plurality of switching elements are turned off in the second voltage stop period.

3. The motor control device according to claim 1, wherein:
a time length of the first voltage stop period is a time length that eliminates current that is generated inside the motor after the first voltage supply period and that flows into the motor and the driving unit through freewheel diodes of the plurality of switching elements, and
a time length of the second voltage stop period is a time length that eliminates current that is generated inside the motor after the second voltage supply period and that flows into the motor and the driving unit through the freewheel diodes of the plurality of switching elements.

4. The motor control device according to claim 1, wherein the control unit performs control in a predetermined control cycle, in which the control unit starts the execution of one cycle of the voltage drop control at a time at which one control cycle starts, and completes the execution of the one cycle of the voltage drop control at a time at which the one control cycle ends.

5. The motor control device according to claim 4, wherein the control unit has the driving unit control each of the first voltage supply period, the first voltage stop period, the second voltage supply period, and the second voltage stop period, in respective time periods, the respective time periods being set by dividing the one control cycle equally by four.

6. The motor control device according to claim 1, wherein, when the voltage that is equal to or higher than the threshold voltage is detected by the voltage detection unit in the state in which the motor is not being driven, the control unit performs the voltage drop control at a time at which a next control cycle starts.

7. The motor control device according to claim 1, wherein, in the case in which the voltage that is equal to or higher than the threshold voltage is detected by the voltage detection unit in the state in which the motor is not being driven, the control unit immediately performs the voltage drop control by interruption processing.

8. A non-transitory recording medium storing a motor control program that is executable by a computer to perform a process, the process comprising:
generating, by a driving unit, a driving voltage that causes a motor to rotate in a predetermined direction and in a direction opposite to the predetermined direction; and
performing, by the driving unit, a voltage drop control that lowers a voltage of a circuit including the driving unit by supplying a driving voltage to the motor and stopping the supply of the driving voltage in a predetermined manner, in a case in which a voltage that is equal to or higher than a threshold voltage is detected by a voltage detection unit in a state in which the motor is not being driven, wherein:
the voltage drop control controls the driving unit by turning a plurality of switching elements of the driving unit on or off, so as to execute the voltage drop control for at least one cycle, each cycle of the voltage drop control having:
a first voltage supply period that has the motor rotate in the predetermined direction,
a first voltage stop period that stops voltage supply to the motor after the first voltage supply period,
a second voltage supply period that has the motor rotate in the direction opposite to the predetermined direction after the first voltage stop period, and
a second voltage stop period that stops voltage supply to the motor after the second voltage supply period; and
a dead time period is provided between the first voltage supply period and the first voltage stop period, between the first voltage stop period and the second voltage supply period, and between the second voltage supply period and the second voltage stop period.

9. The non-transitory recording medium according to claim 8, wherein:

each of the plurality of switching elements is a field effect transistor in which a freewheel diode is connected between a source and a drain, and the voltage drop control is performed such that:

a first portion of the plurality of switching elements, which generate a voltage that has the motor rotate in the predetermined direction, are turned on in the first voltage supply period, all the plurality of switching elements are turned off in the first voltage stop period, a second portion of the plurality of switching elements, which generate a voltage that has the motor rotate in the direction opposite to the predetermined direction, are turned on in the second voltage supply period, and all the plurality of switching elements are turned off in the second voltage stop period.

10. The non-transitory recording medium according to claim 8, wherein:

a time length of the first voltage stop period is a time length that eliminates current that is generated inside the motor after the first voltage supply period and that flows into the motor and the driving unit through freewheel diodes of the plurality of switching elements, and a time length of the second voltage stop period is a time that eliminates current that is generated inside the motor after the second voltage supply period and that flows into the motor and the driving unit through the freewheel diodes of the plurality of switching elements.

11. The non-transitory recording medium according to claim 8, wherein the execution of one cycle of the voltage drop control starts at a time at which one control cycle of the computer starts, and the execution of the one cycle of the voltage drop control is completed at a time at which the one control cycle ends.

12. The non-transitory recording medium according to claim 11, wherein the voltage drop control controls each of the first voltage supply period, the first voltage stop period, the second voltage supply period, and the second voltage stop period, in respective time periods, the respective time periods being set by dividing the one control cycle equally by four.

13. The non-transitory recording medium according to claim 8, wherein, in the case in which the voltage that is equal to or higher than the threshold voltage is detected by the voltage detection unit in the state in which the motor is not being driven in a current control cycle, the voltage drop control is performed at a time at which a next control period starts.

14. The non-transitory recording medium according to claim 8, wherein, in the case in which the voltage that is equal to or higher than the threshold voltage is detected by the voltage detection unit in the state in which the motor is not being driven, the voltage drop control is immediately performed by interruption processing.

* * * * *